United States Patent
Ogura et al.

(10) Patent No.: US 10,783,365 B2
(45) Date of Patent: Sep. 22, 2020

(54) IMAGE PROCESSING DEVICE AND IMAGE PROCESSING SYSTEM

(71) Applicant: HITACHI KOKUSAI ELECTRIC INC., Tokyo (JP)

(72) Inventors: Shinya Ogura, Tokyo (JP); Ryosuke Kimura, Tokyo (JP); Seiichi Hirai, Tokyo (JP); Satoshi Maruta, Tokyo (JP); Sho Nishino, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 202 days.

(21) Appl. No.: 15/740,918

(22) PCT Filed: Jun. 17, 2016

(86) PCT No.: PCT/JP2016/068129
§ 371 (c)(1),
(2) Date: Dec. 29, 2017

(87) PCT Pub. No.: WO2017/006749
PCT Pub. Date: Jan. 12, 2017

(65) Prior Publication Data
US 2018/0197000 A1 Jul. 12, 2018

(30) Foreign Application Priority Data
Jul. 3, 2015 (JP) ................. 2015-134392

(51) Int. Cl.
G06K 9/00 (2006.01)
G08B 25/00 (2006.01)
(Continued)

(52) U.S. Cl.
CPC ......... G06K 9/00369 (2013.01); G06F 7/588 (2013.01); G06K 9/00288 (2013.01);
(Continued)

(58) Field of Classification Search
CPC ........ A61B 2034/2065; G06K 2209/21; G06T 7/231; G06T 7/223; G06T 7/246; G08B 13/19602
See application file for complete search history.

(56) References Cited

U.S. PATENT DOCUMENTS 8,649,574 B2 * 2/2014 Mise ................. H04N 5/23212
348/222.1
2002/0136434 A1 * 9/2002 Kuroda ............... G06Q 20/383
382/118
(Continued)

FOREIGN PATENT DOCUMENTS

JP 2004-126812 A 4/2004
JP 2009-027221 A 2/2009
(Continued)

OTHER PUBLICATIONS

International Search Report from International Application No. PCT/JP2016/068129 dated Sep. 6, 2016.

Primary Examiner — Avinash Yentrapati
(74) Attorney, Agent, or Firm — Brundidge & Stanger, P.C.

(57) ABSTRACT

An image processing device or a method of processing an image is disclosed. The method includes receiving an image, detecting a plurality of person images in the image, identifying at least a first person image from among the plurality of person images by a preferential method, identifying at least a second person image from among the plurality of person images excluding the first person image, by an exhaustive method, and extracting a first feature amount as to the first person image and a second feature amount as to the second person image during a time interval. For example, the total number of the first person images and the second person images is no more than a maximum number (Continued)

of person images, identified by performance corresponding to process the person images during the time interval.

20 Claims, 5 Drawing Sheets

(51) Int. Cl.
  *G08B 13/194* (2006.01)
  *G08B 13/196* (2006.01)
  *G06F 7/58* (2006.01)
  *G06K 9/62* (2006.01)

(52) U.S. Cl.
  CPC ....... *G06K 9/00771* (2013.01); *G06K 9/6217* (2013.01); *G08B 13/194* (2013.01); *G08B 13/196* (2013.01); *G08B 25/00* (2013.01)

(56) References Cited

U.S. PATENT DOCUMENTS

| | | | | |
|---|---|---|---|---|
| 2004/0186706 A1* | 9/2004 | Itoh | ...................... | G06F 40/211 704/10 |
| 2008/0013787 A1* | 1/2008 | Kobayashi | ......... | H04N 5/23219 382/103 |
| 2008/0199056 A1* | 8/2008 | Tokuse | ............... | H04N 5/23219 382/118 |
| 2009/0232364 A1* | 9/2009 | Hosoi | ................ | G06K 9/00261 382/118 |
| 2011/0096994 A1* | 4/2011 | Hirai | ...................... | G06F 16/58 382/190 |
| 2013/0329059 A1* | 12/2013 | Uchikoshi | ............. | G06K 9/036 348/207.1 |
| 2014/0193077 A1* | 7/2014 | Shiiyama | .............. | G06F 16/583 382/190 |
| 2016/0350583 A1* | 12/2016 | Nishino | ............ | G06K 9/00711 |
| 2018/0081908 A1* | 3/2018 | Matsubara | ............... | G06K 9/46 |

FOREIGN PATENT DOCUMENTS

| | | |
|---|---|---|
| JP | 2009-223580 A | 10/2009 |
| JP | 2011-107795 A | 6/2011 |
| JP | 2013-101431 A | 5/2013 |
| JP | 2013-134570 A | 7/2013 |

* cited by examiner

Fig. 5

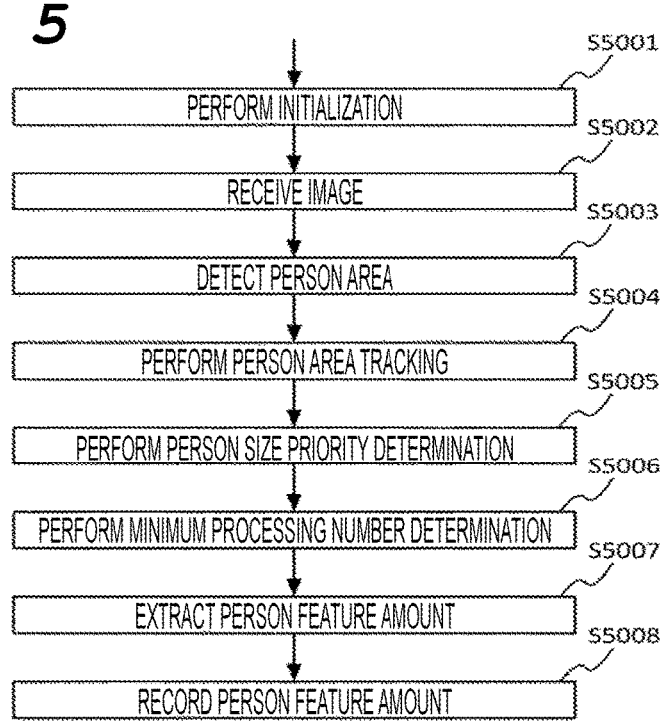

*Fig.6(a)* 500

|  | PERSON SIZE | CUMULATIVE NUMBER OF FEATURE AMOUNT EXTRACTION PROCESSING | CURRENT FEATURE AMOUNT EXTRACTION FLAG |
|---|---|---|---|
| PERSON A | 0 | 4 | 0 |
| PERSON B | 0 | 1 | 0 |
| PERSON C | 0 | 3 | 0 |

*Fig.6(b)* 500

|  | PERSON SIZE | CUMULATIVE NUMBER OF FEATURE AMOUNT EXTRACTION PROCESSING | CURRENT FEATURE AMOUNT EXTRACTION FLAG |
|---|---|---|---|
| PERSON A | 72 PIXELS | 4 | 0 |
| PERSON B | 60 PIXELS | 1 | 0 |
| PERSON C | 48 PIXELS | 3 | 0 |
| PERSON D | 38 PIXELS | 0 | 0 |

*Fig.6(c)* 500

|  | PERSON SIZE | CUMULATIVE NUMBER OF FEATURE AMOUNT EXTRACTION PROCESSING | CURRENT FEATURE AMOUNT EXTRACTION FLAG |
|---|---|---|---|
| PERSON A | 72 PIXELS | 5 | 1 |
| PERSON B | 60 PIXELS | 2 | 1 |
| PERSON C | 48 PIXELS | 3 | 0 |
| PERSON D | 38 PIXELS | 0 | 0 |

*Fig.6(d)* 500

|  | PERSON SIZE | CUMULATIVE NUMBER OF FEATURE AMOUNT EXTRACTION PROCESSING | CURRENT FEATURE AMOUNT EXTRACTION FLAG |
|---|---|---|---|
| PERSON A | 72 PIXELS | 5 | 1 |
| PERSON B | 60 PIXELS | 2 | 1 |
| PERSON C | 48 PIXELS | 3 | 0 |
| PERSON D | 38 PIXELS | 1 | 1 |

Fig.9(a)
510

|  | PERSON SIZE | CURRENT FEATURE AMOUNT EXTRACTION FLAG |
|---|---|---|
| PERSON A | 72 PIXELS | 0 |
| PERSON B | 60 PIXELS | 0 |
| PERSON C | 48 PIXELS | 0 |
| PERSON D | 38 PIXELS | 0 |

Fig.9(b)
510

|  | PERSON SIZE | CURRENT FEATURE AMOUNT EXTRACTION FLAG |
|---|---|---|
| PERSON A | 72 PIXELS | 1 |
| PERSON B | 60 PIXELS | 1 |
| PERSON C | 48 PIXELS | 0 |
| PERSON D | 38 PIXELS | 0 |

Fig.9(c)
510

|  | PERSON SIZE | CURRENT FEATURE AMOUNT EXTRACTION FLAG |
|---|---|---|
| PERSON A | 72 PIXELS | 1 |
| PERSON B | 60 PIXELS | 1 |
| PERSON C | 48 PIXELS | 0 |
| PERSON D | 38 PIXELS | 1 |

IMAGE PROCESSING DEVICE AND IMAGE PROCESSING SYSTEM

TECHNICAL FIELD

The present invention relates to a similar image processing system, and in particular to an image processing device and an image processing system suitable for use in thinning out detection results of similar image search or similar image detection of a specific person in a video captured/recorded by a video surveillance system.

BACKGROUND ART

Conventionally, a video surveillance system has been installed at facilities and places visited by many and unspecified people, such as hotels, buildings, convenience stores, financial institutions, dams, and roads, for the purpose of prevention of crimes and accidents. The video surveillance system captures a person or the like to be monitored with an imaging device such as a camera, transmits the captured video to a surveillance center such as a management office or a security office, monitoring the video by a resident surveillant, and raises an alarm or records and saves the video according to the purpose or as needed.

In the recording and storage of the video in the video surveillance system, there are increasing cases where a random access medium typified by a hard disk drive (HDD) is used instead of a conventional video tape medium as a recording medium. Furthermore, in recent years, the capacity of such a recording medium has been increased.

While the increase in the capacity of the recording medium dramatically increases the amount of videos that can be recorded and enables recording of a larger number of points and for a longer time, an increase in the burden of visual check of recorded images is becoming a problem.

Against such a background, a video surveillance system having a search function to easily find out a desired video is becoming widespread. Especially, in recent years, a system having a higher-level search function is emerging, which automatically detects occurrence of a specific event in a video in real time using an image recognition technique, records the even with the video, and enables search for the event afterward. One of typical systems is a person search function.

The person search function is a function to record appearance of a person in the video as a target of automatic detection in real time and to search a person appearance image from the recorded image afterward. From the functional aspect, the person search function is roughly classified into the following two types.

The first type is an appearance event search function. The appearance event search function is a function to simply search for presence or absence of person appearance (event) in the video. As a search result, the presence or absence of the event is presented. In addition, when the event "presence" is determined, the number of events, occurrence time of each event, an imaging device number of the image device that has captured the event, a captured image (a person appearance image), and the like are presented. Note that a query of this search is often given as information for narrowing down a search target range such as the event occurrence time and the imaging device number. Hereinafter, the information for narrowing down the search target range is referred to as "narrow-down parameter".

The second type is a similar person search function. While the above-described appearance event search function is a search that does not specify a character, this function is to search for, from the recorded image, whether a specific person designated by a user is captured by another imaging device at another time or at another point. The search result includes presence or absence of other images in which the specific person is captured. In addition, when the specific person is "present", the number of the images, captured times of the images, the imaging device number, the captured images (person appearance images), the degree of similarity described below, and the like are returned. The designation of the specific person is carried out by the user by designating one image (hereinafter referred to as search key image) in which the person to be found is captured. The search key image is designated from a recorded image or an arbitrary image from an external device. The search is realized by extracting an image feature amount of the person in the search key image by an image recognition technique, collating the image feature amount with an image feature amount of a person in the recorded image, obtaining a similarity (the degree of similarity), and performing same person determination. In the same person determination, as an example, the degree of similarity of image feature amounts about the persons in the two images to be compared, and when the result (the degree of similarity) is a predetermined reference value or more, these persons are determined to be the same person. Note that extraction and recording of the image feature amount of the person in the recorded image is performed in advance at another timing such as at the time of recording the video. In this search query, a narrow-down parameter can be often provided.

Patent Literature 1 discloses a similar image search system that divides a single image in a lattice shape manner and aggregates similar images to reduce the number of search times in a case of using the similar image search system as a discriminator.

Further, Patent Literature 2 discloses a technique that can realize both suppression of the number of times of search and improvement of search accuracy regarding a similar image search system that repeats similar image search using a plurality of search keys to perform exhaustive search. Apart from the above search needs, a similar face image detection system exists, which notifies a surveillant when a face having a high degree of similarity to one or more previously registered faces is caught by a camera of the video surveillance system.

CITATION LIST

Patent Literature

Patent Literature 1: JP 2011-107795 A
Patent Literature 2: JP 2013-101431 A

SUMMARY OF INVENTION

Technical Problem

However, in a similar image "search" system, a detection of a person image within an image in the flow of continuous images (video stream) should be recorded during a time interval between images, as a target image for automatic detection. Here, this recording process is called as a registration processing. When many person images are detected within the image, the registration processing may not be performed in the time interval. At this time, some following images to be processed after the image may be omitted while all the person images are being processed.

In addition, in a similar image "detection" system, similar image detection processing should be performed during the time interval so as to report a detection for appearance of a target person in the flow of continuous images (video stream). However, if many person images are detected within the image, some following images to be processed after the image may be omitted while determining whether each detected person image is similar to the previously registered image or not, respectively, through all registered images (hereinafter, the processing is called collation processing) is being performed.

As described above, in the similar image search system and the similar image detection system, there is an advantage that all the persons are exhaustively processed once, but there is a problem that a detection result at best timing, that is, an image to be processed may be omitted and the processing may not be performed while the persons are automatically detected a plurality of times while passing in front of the camera, resulting in poor search and detection accuracy.

Therefore, when operating the similar image search system and the similar image detection system, a method is sometimes employed, which performs setting to process only an image in which the person to be detected is captured with a relatively large size to prevent omission of an image at the best timing. In doing so, an effect to have only images with high search accuracy in the similar image search system and images with high detection accuracy in the similar image detection system as the search targets can be obtained. However, with such a method, when a person is stopped in front, a person behind may pass through without undergoing the registration processing of the similar image search system and the collation processing of the similar image detection system.

Patent Literature 1 described above reduces the processing amount of when automatically detecting appearance of a person in a video. However, Patent Literature 1 is not related to the registration processing in the similar image search system and the collation processing in the similar image detection system. Further, Patent Literature 2 described above realizes both the suppression of the number of times of search and the improvement of the search accuracy in the similar image search system. However, Patent Literature 2 is not related to the registration processing in the similar image search system and the collation processing in the similar image detection system.

The present invention has been made in view of such conventional circumstances, and an object of the present invention is to reduce omission of an image or a person to be processed to improve search and detection accuracy.

Solution to Problem

To achieve the above objective, an image processing device according to the present invention is an image processing device that calculates a feature amount of a person from an image, the image processing device including: person area detection means that detects a person area from an image; person feature amount extraction means that calculates, using an image recognition technique, a feature amount of the person area of a person detected by the person area detection means; person size calculation means that calculates an image size of the person on the basis of the person area detected by the person area detection means; and person feature amount extraction target selection means that selects, as a person feature amount extraction target by the person feature amount extraction means, at least a person having a largest image size from among the persons calculated by the person size calculation means, and selects, as the person feature amount extraction target by the person feature amount extraction means, a person having a minimum past cumulative number of the feature amounts by the person feature amount extraction means from among persons not the person feature amount extraction targets.

Further, to achieve the above objective, an image processing device according to the present invention is an image processing device that calculates a feature amount of a person from an image, the image processing device including: person area detection means that detects a person area from an image; person feature amount extraction means that calculates, using an image recognition technique, a feature amount of the person area of a person detected by the person area detection means; person size calculation means that calculates an image size of the person on the basis of the person area detected by the person area detection means; random number generation means that generates a random number; and person feature amount extraction target selection means that selects, as a person feature amount extraction target by the person feature amount extraction means, at least a person having a largest image size from among the persons calculated by the person size calculation means, performs an arithmetic operation using the random number generated by the random number generation means, and selects a person who is to be the person feature amount extraction target by the person feature amount extraction means from among persons determined not to be the person feature amount extraction targets according to a result of the performed arithmetic operation.

Further, to achieve the above objective, an image processing system according to the present invention is an image processing system that calculates a feature amount of a person from an image, the image processing system including: imaging means that images an image; recording means that records image data imaged by the imaging means; and image processing means that processes the image data, wherein the image processing means includes person area detection means that detects a person area from an image imaged by the imaging means, person feature amount extraction means that calculates, using an image recognition technique, a feature amount of the person area of a person detected by the person area detection means, person size calculation means that calculates an image size of the person on the basis of the person area detected by the person area detection means, and person feature amount extraction target selection means that selects, as a person feature amount extraction target by the person feature amount extraction means, at least a person having a largest image size from among the persons calculated by the person size calculation means, and selects, as the person feature amount extraction target by the person feature amount extraction means, a person having a minimum past cumulative number of the feature amounts by the person feature amount extraction means from among persons not the person feature amount extraction targets, and the imaging means, the recording means, and the image processing means are connected by a network.

Further, to achieve the above objective, an image processing system according to the present invention is an image processing system that calculates a feature amount of a person from an image, the image processing system including: imaging means that images an image; recording means that records image data imaged by the imaging means; and image processing means that processes the image data, wherein the image processing means includes person area detection means that detects a person area from the image imaged by the imaging means; person feature amount extraction means that calculates, using an image recognition technique, a feature amount of the person area of a person detected by the person area detection means; person size calculation means that calculates an image size of the person on the basis of the person area detected by the person area detection means; random number generation means that generates a random number; and person feature amount extraction target selection means that selects, as a person feature amount extraction target by the person feature amount extraction means, at least a person having a largest image size from among the persons calculated by the person size calculation means, performs an arithmetic operation using the random number generated by the random number generation means, and selects a person who is to be the person feature amount extraction target by the person feature amount extraction means from among persons determined not to be the person feature amount extraction targets according to a result of the performed arithmetic operation, and the imaging means, the recording means, and the image processing means are connected by a network.

Advantageous Effects of Invention

According to the present invention, search and detection accuracy can be improved by reducing omission of an image or a person to be processed.

BRIEF DESCRIPTION OF DRAWINGS

FIG. 5 is a diagram illustrating an example of a sequence of search person registration processing in the image processing system according to the first embodiment of the present invention.

FIGS. 6(a) to 6(d) are diagrams illustrating examples of a search person registration table in the image processing system according to the first embodiment of the present invention.

FIGS. 9(a) to 9(c) are diagrams illustrating examples of a search person registration table in the image processing system according to the second embodiment of the present invention.

DESCRIPTION OF EMBODIMENTS

First Embodiment

Hereinafter, an image processing system according to a first embodiment of the present invention will be described with reference to the drawings.

[Configuration of Image Processing System]

Figure 1:
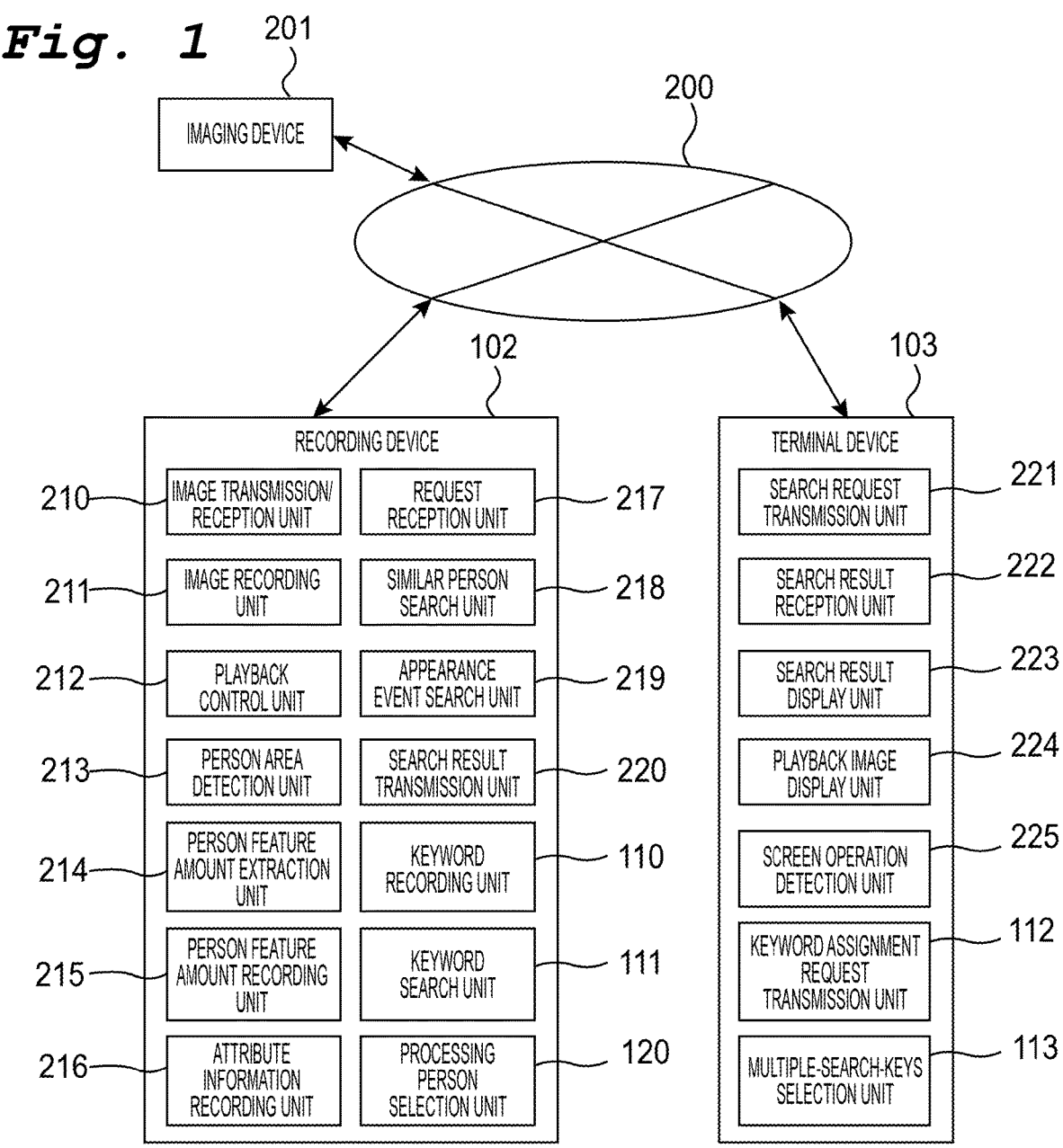
FIG. 1 is a diagram exemplarily illustrating a system configuration of an image processing system according to a first embodiment of the present invention.

First, a configuration of an image processing system according to the first embodiment of the present invention will be described with reference to FIG. 1. FIG. 1 is a diagram exemplarily illustrating a system configuration of the image processing system according to the first embodiment of the present invention.

As illustrated in FIG. 1, the image processing system according to the first embodiment includes an imaging device 201, a recording device 102, and a terminal device 103 that are communicatively connected to a network 200.

The network 200 is communication means for connecting devices such as a dedicated network for data communication, an intranet, the Internet, and a wireless local area network (LAN) to one another, and performing communication.

The imaging device 201 is a device such as a network camera or a surveillance camera that applies digital conversion processing to an image captured by a charge coupled device (CCD), a complementary metal oxide semiconductor (CMOS) element, or the like, and outputs converted image data to the recording device 102 etc. via the network 200 as a plurality of frames at the frame interval.

The recording device 102 is a device such as a network digital recorder that records the image data input from the imaging device 201 via the network 200 on a recording medium such as an HDD. In addition, this device is also equipped with a person search function including the method of the present invention.

The recording device 102 includes, as functional configurations, an image transmission/reception unit 210, an image recording unit 211, a playback control unit 212, a person area detection unit 213, a person feature amount extraction unit 214, a person feature amount recording unit 215, an attribute information recording unit 216, a request reception unit 217, a similar person search unit 218, an appearance event search unit 219, a search result transmission unit 220, a keyword recording unit 110, a keyword search unit 111, and a processing person selection unit 120.

The Image transmission/reception unit 210 is a processing unit that inputs and outputs an image from an outside of the device, and receives input image data from the imaging device 201 at the frame interval and transmits output image data to the terminal device 103.

The image recording unit 211 writes input the input image data to a recording medium and reads the output image data from a recording medium. In writing, the image recording unit 211 records an image ID (image identification information) serving as information in reading the image data, in addition to the image data. Further, to prevent running out of a storage capacity of the recording medium, the image recording unit 211 automatically overwrites old image data with newly captured image data.

The playback control unit 212 controls video playback to the terminal device 103.

The person area detection unit 213 performs, for the input image data, person detection using an image recognition technique to determine presence of a person in the image, and calculates coordinates of an area if there is a person.

The person feature amount extraction unit 214 calculates, for the area detected by the person area detection unit 213, the feature amount using an image recognition technique. Examples of the person feature amount to be calculated here includes the shape and direction of the outline of the person, the color of the skin, the gait (how to handle the legs such as which leg is moved, how the leg is moved, and what timing the leg is moved), the shape and direction of the outline of the face, which is a representative portion for specifying the person, and the size, shape, arrangement relationship of main configuration elements such as the eyes, nose and mouth. In the present embodiment, any number and type of the feature amount may be employed.

The person feature amount recording unit 215 writes and reads the feature amount calculated by the person feature amount extraction unit 214 to the recording medium. The recording medium of the image data in the image recording unit 211 and the recording medium of the person feature amount in the main processing unit may be the same or different.

The attribute information recording unit 216 writes and reads attribute information related to the image data to and from the recording medium. The attribute information is, for example, a captured time of an image and an imaging device number.

The request reception unit 217 receives a search request and a keyword assignment request from the terminal device 103. The search request includes a similar person search request and an appearance event search request.

When the request received by the request reception unit 217 is the similar person search request, the similar person search unit 218 performs similar image search. The appearance event search unit 219 performs search in a case where the request received by the request reception unit 217 is the appearance event search request.

The search result transmission unit 220 transmits a similar person search result and an appearance event search result obtained from the similar person search unit 218 and the appearance event search unit 219 to the terminal device 103.

The keyword recording unit 110 writes and reads keywords based on the keyword assignment request received by the request reception unit 217 to and from the recording medium. The keyword search unit 111 performs keyword search in a case where the request received by the request reception unit 217 is a keyword search request.

The processing person selection unit 120 determines whether individually sending a plurality of the detection results of the person area detection unit 213 to the next processing.

The terminal device 103 may be realized by a general personal computer (PC) having a network function or may be a dedicated search terminal.

The terminal device 103 includes, as a functional configurations, a search request transmission unit 221, a search result reception unit 222, a search result display unit 223, a playback image display unit 224, a screen operation detection unit 225, a keyword assignment request transmission unit 112, a multiple-search-keys selection unit 113. Further, this device is also equipped with a person search function for realizing the method of the present invention.

The search request transmission unit 221 transmits a search request to the recording device 102. In a case of the similar person search, search request data includes a search key image or its feature amount as a search key for the similar person search. In addition, the search request data may include a narrow-down parameter.

The search result reception unit 222 receives a search result from the recording device 102. The data received as the search result includes a set of images obtained by executing the similar person search or the appearance event search in the recording device 102. Individual images that configure the set are generated through image size reduction processing and the like from the video recorded in the recording device 102. Hereinafter, these individual images are referred to as "search result images", and the data transmitted and received as the search result is referred to as "search result data".

The search result display unit 223 displays the search result received by the search result reception unit 222 on a display.

The playback image display unit 224 displays a continuous moving image of the image data input from the recording device 102 on the screen.

The screen operation detection unit 225 detects and acquires operation content by a user.

The keyword assignment request transmission unit 112 transmits a keyword assignment request to the recording device 102.

When a plurality of search keys is selected, the multiple-search-keys selection unit 113 performs processing for appropriately selecting a smaller number of search keys. The multiple-search-keys selection unit 113 may be provided in the recording device 102.

[Hardware Configuration of Imaging Device]

Figure 2:
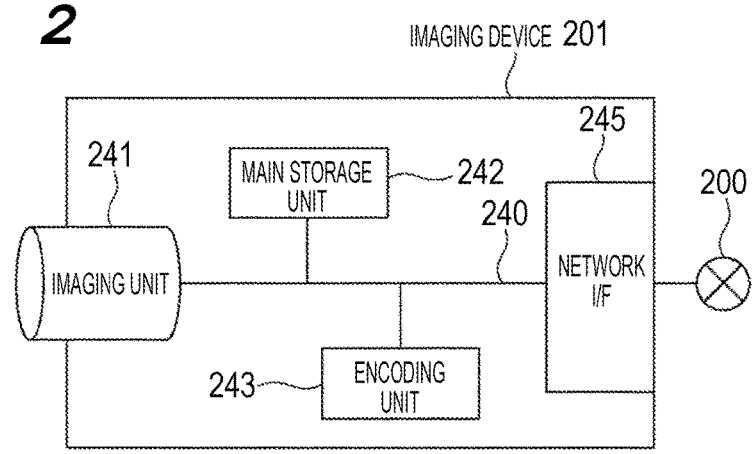
FIG. 2 is a diagram exemplarily illustrating a hardware configuration of an imaging device used in the image processing system according to the first embodiment of the present invention.

FIG. 2 exemplarily illustrates a hardware configuration of the imaging device 201 used in the image processing system according to the first embodiment of the present invention.

As illustrated in FIG. 2, the hardware configuration of the imaging device 201 includes an imaging unit 241, a main storage unit 242, an encoding unit 243, and a network interface (I/F) 245 that are connected with a bus 240.

The imaging unit 241 converts an optical signal imaged through a lens into digital data. The encoding unit 243 encodes the digital data output from the imaging unit 241 and converts the digital data into image data such as Joint Photographic Experts Group (JPEG). The main storage unit 242 stores captured digital data and encoded image data. The network I/F 245 is an interface for transmitting the image data on the main storage unit 242 to the recording device 102 etc. via the network 200 at the time interval.

[Hardware Configuration of Recording Device]

Figure 3:
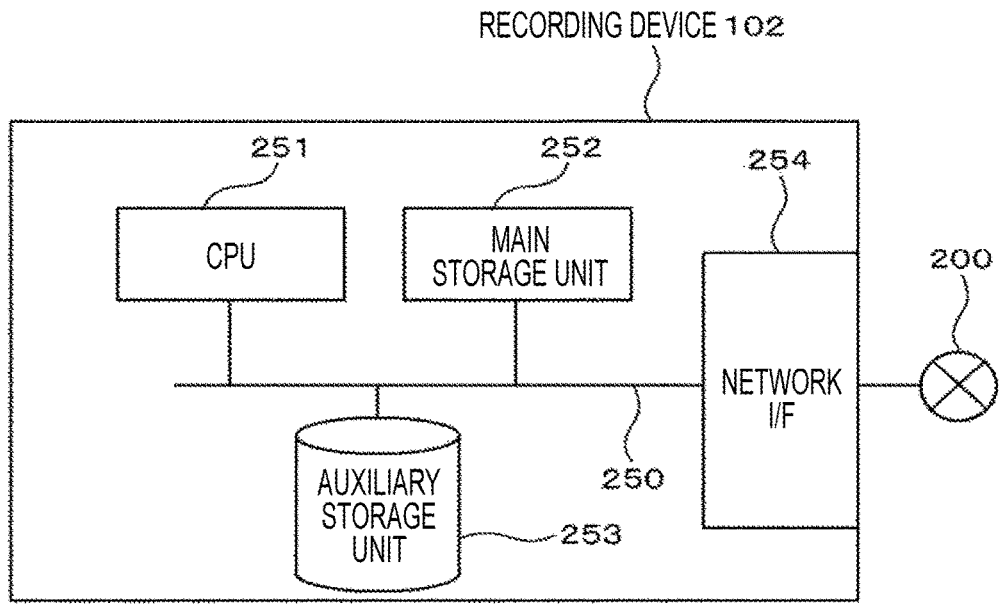
FIG. 3 is a diagram exemplarily illustrating a hardware configuration of a recording device used in the image processing system according to the first embodiment of the present invention.

FIG. 3 exemplarily illustrates a hardware configuration of the recording device 102 used in the image processing system according to the first embodiment of the present invention.

As illustrated in FIG. 3, the hardware configuration of the recording device 102 includes a central processing unit (CPU) 251, a main storage unit 252, an auxiliary storage unit 253, and a network I/F 254 that are connected with a bus 250.

The CPU 251 controls the units of the recording device 102 and executes programs for realizing the functions. The main storage unit 252 is realized by a semiconductor device such as a dynamic random access memory (DRAM), and is an intermediate memory for loading and storing the image data for search and the programs executed by the CPU 251. The auxiliary storage unit 253 is realized by an HDD, a flash memory, or the like, is a memory having a larger capacity than the main storage unit 252, and stores image data and programs. The network I/F 254 is an interface for receiving the image data from the imaging device 201 via the network 200, receiving search keywords from the terminal device 103, and transmitting the image data to the terminal device 103.

[Hardware Configuration of Terminal Device]

Figure 4:
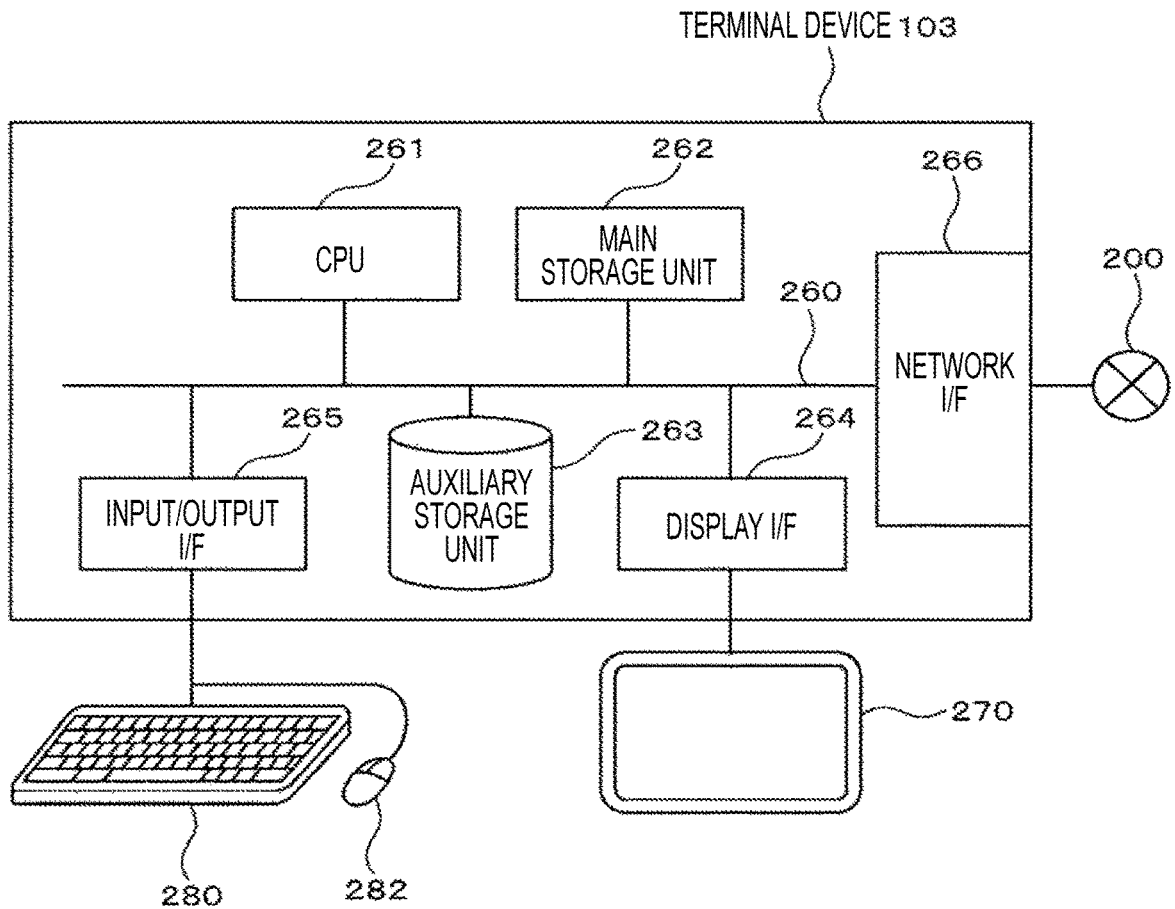
FIG. 4 is a diagram exemplarily illustrating a hardware configuration of a terminal device used in the image processing system according to the first embodiment of the present invention.

FIG. 4 exemplarily illustrates a hardware configuration of the terminal device 103 used in the image processing system according to the first embodiment of the present invention.

As illustrated in FIG. 4, the hardware configuration of the terminal device 103 includes a CPU 261, a main storage unit 262, an auxiliary storage unit 263, a display I/F 264, an input/output I/F 265, and a network I/F 266 that are connected with a bus 260. Further, the display I/F 264 is connected with a display device 270, and the input/output I/F 265 is connected with input/output devices such as a keyboard 280 and a mouse 282.

The CPU 261 controls the units of the terminal device 103 and executes programs for realizing the functions. The main storage unit 262 is realized by a semiconductor device such as a DRAM, and is an intermediate memory for loading and storing the image data for display and the programs executed by the CPU 261. The auxiliary storage unit 263 is realized by an HDD, a flash memory, or the like, is a memory having a larger capacity than the main storage unit 262, and stores search keywords, image data, and programs. The display I/F 264 is an interface for being connected with the display device 270. The input/output I/F 265 is an interface for being connected with the input/output devices such as the keyboard 280 and the mouse 282. The network I/F 266 is an interface for receiving the image data from the recording device 102 via the network 200 and transmitting the search keywords to the recording device 102.

The display device 270 is a device such as a liquid crystal display (LCD), and is a device for displaying an image or a moving image on its display unit. The user operates an image displayed in the display unit of the display device 270 with the input/output device such as the keyboard 280 or the mouse 282 by a graphic user interface (GUI) operation to operate the terminal device 103 and the image processing system.

[Search Person Registration Processing of Image Processing System]

Next, search person registration processing in the image processing system according to the first embodiment of the present invention will be described with reference to FIG. 5, and FIGS. 6(a) to 6(d). FIG. 5 is a diagram illustrating an example of a sequence of the search person registration processing in the image processing system according to the first embodiment of the present invention. Further, FIGS. 6(a) to 6(d) are diagrams illustrating examples of a search person registration table in the image processing system according to the first embodiment of the present invention. As illustrated in FIGS. 6 (a) to 6 (d), in each search person registration table 500, a person tracking result in the search person registration processing in the image processing system, a person size, a cumulative number of feature amount extraction processing, and a current feature amount extraction flag are registered, respectively.

In the present embodiment, an image processing system having performance corresponding to register maximum three person images per image during the time interval will be described. The registration processing procedure per image in FIG. 5 is repeatedly executed for each image. Here, a case of detecting four person images per image after executing the procedure a plurality of times will be described.

In initial initialization processing (S5001), the memory is secured and the current feature amount extraction flag is cleared to zero. Values in the search person registration table 500 on the memory are as illustrated in FIG. 6 (a). For example, the cumulative number of feature amount extraction processing is "4" for a person A, "1" for a person B, and "3" for a person C. The method of counting the cumulative number of feature amount extraction processing will be described below.

Next, in image receiving processing (S5002), the image transmission/reception unit 210 of the recording device 102 receives an image corresponding to a time from the imaging device 201.

Next, in the process for detecting a person area (S5003), the person area detection unit 213 of the recording device 102 detects a person area from the image. In this embodiment, the person area is an area of the face. Further, in the present embodiment, four person images are detected. The respective detected areas are held in the memory and are made referable by the next processing.

Next, process for tracking the person area (S5004), identifying a person image based on a person size (S5005), and minimum processing number determination (S5006) are performed by the processing person selection unit 120 of the recording device 102.

In the process for tracking the person area (S5004), processing of tracking a person processed previous time and a person processed this time is performed according to a positional relationship between a detection position of the person area of the previous time and a detection position of the person area of this time. By this processing, which detection result belongs to which person is known, and thus the person sizes are respectively calculated from the person areas and can be associated with the persons, as illustrated in FIG. 6(b). Here, the person size of the person A is "72 pixels", the person size of the person B is "60 pixels", and the person size of the person C is "48 pixels". Further, a person D undetected previous time is detected for the first time with the person size of "38 pixels".

In the present embodiment, the process for tracking the person area (S5004) is performed according to the positional relationship between a detection position of the person area of the previous time and a detection position of the person area of this time. However, the tracking processing may be performed by another method such as the degree of coincidence of the feature amount between a face image of the person area of the previous time and a face image of the person area of this time instead of the positional relationship.

In the identifying a person image based on a person size (S5005), processing of selecting at least a person image having a maximum person size from among the persons A to D is performed. Here, processing of selecting two person images having large person sizes is performed. How many persons from the person having the maximum person size is elected is determined according to the processing capacity of the system. In a case where a plurality of persons having the substantially same maximum size exists, a person may be randomly selected or a person having a small extraction history nay be selected.

In the example illustrated in FIG. 6(c), the person A having the person size "72 pixels" and the person B having the person size "60 pixels" are selected. The current feature amount extraction flags of the selected person A and person B are changed to "1", and each cumulative number of times of processing for extracting a feature amount is incremented by 1, respectively.

In the present embodiment, in the identifying a person image based on a person size (S5005), processing of selecting two person images is performed. However, the number of the person images may be one instead of two. In addition, if the performance to register the person images during the time interval corresponds to four person images, not three person images, three person images can be selected.

In the identifying a person image based on the cumulative number of times for extracting (S5006), a person having a small cumulative number of times for extracting a feature amount is selected from among the persons having the current feature amount extraction flag of "0". Then, the cumulative number of times for extracting a feature amount is increased by one, and the current feature amount extraction flag is set to "1". For example, a person having the minimum cumulative number of times for extracting a feature amount is selected. In a case where a plurality of persons having the minimum number exists, a person is randomly selected or a person having a larger person size is selected. Specifically, at the stage of FIG. 6(c), between the persons C and D having the current feature amount extraction flag "0", the cumulative number of times for extracting a feature amount of the person D is "0" and is smaller than that of the person C. Therefore, the person D is selected, and the current feature amount extraction flag of the person D becomes "1" and the cumulative number of times for extracting a feature amount of the person D becomes "1", as illustrated in FIG. 6(d).

In the process for extracting a feature amount of the person (S5007), the person feature amount extraction unit 214 of the recording device 102 calculates the feature amount for the person area of the person having the current feature amount extraction flag of "1" by an image recognition technique. To be specific, in the case of FIG. 6(d), the feature amount is calculated for the persons A, B, and D.

In the person feature amount recording processing (S5008), the person feature amount recording unit 215 of the recording device 102 writes the feature amount calculated in the process for extracting a feature amount of the person (S5007) to the recording medium.

In the present embodiment, the identifying a person image based on a person size (S5005) is provided. However, the identifying a person image can be based at least in part on a direction that a person is facing. For example, a person image of a person substantially facing a camera can be identified as a person image for extracting a feature amount, instead of the detected person size of the image. In addition, in the process for detecting a person area (S5003), a person image substantially determined to be more likely to be a person, can be identified as a person image for extracting a feature amount. An image of a person here may be employed the whole image of a person, or only the face image of a person to determine to be more likely to be a person.

As described above, according to the image processing system of the first embodiment of the present invention, omission of an image or a person to be processed is reduced and search and detection accuracy can be improved.

Second Embodiment

Hereinafter, an image processing system according to a second embodiment of the present invention will be described with reference to the drawings. Note that, in the description of the drawings, a configuration element having a function common to the image processing system according to the first embodiment of the present invention is denoted with the same reference sign, and description is omitted to avoid overlapping description as much as possible.

[Configuration of Image Processing System]

Figure 7:
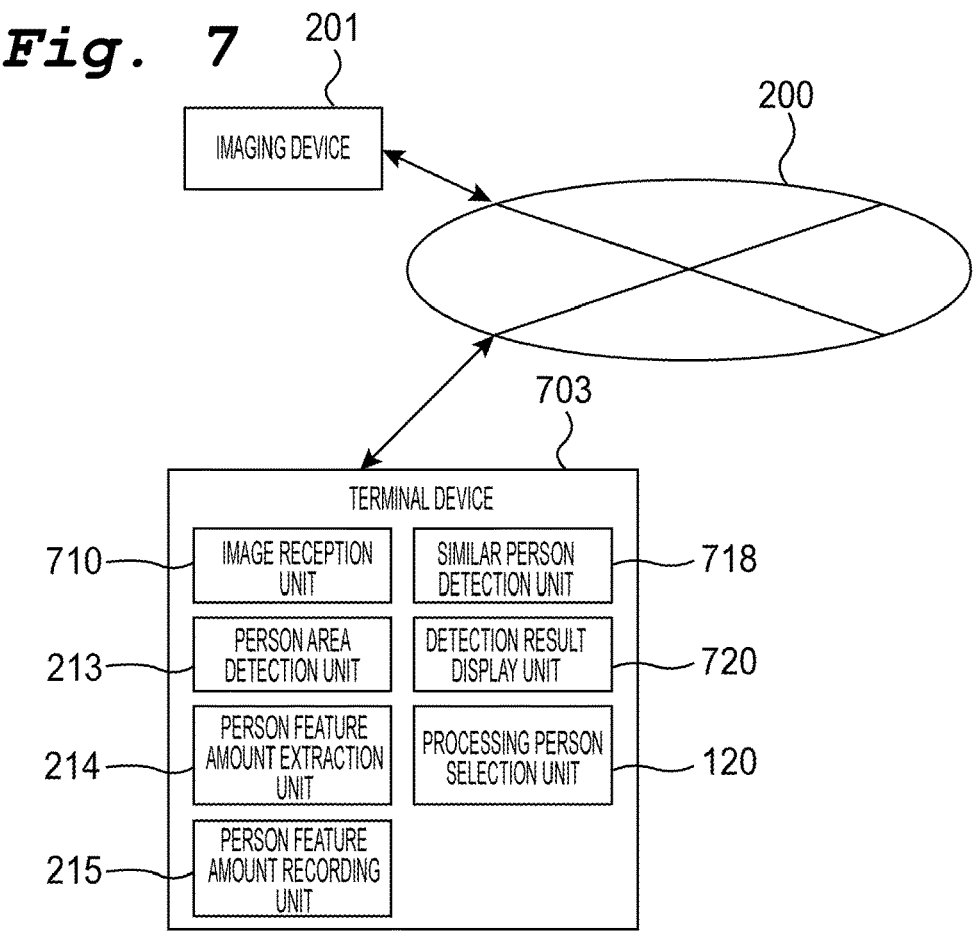
FIG. 7 is a diagram exemplarily illustrating a system configuration of an image processing system according to a second embodiment of the present invention.

First, a configuration of an image processing system according to the second embodiment of the present invention will be described with reference to FIG. 7. FIG. 7 is a diagram exemplarily illustrating a system configuration of an image processing system according to the second embodiment of the present invention.

As illustrated in FIG. 7, the image processing system according to the second embodiment includes an imaging device 201 and a terminal device 703 that are communicatively connected to a network 200.

The terminal device 703 may be realized by a general personal computer (PC) having a network function or may be a dedicated search terminal.

The terminal device 703 includes, as functional configurations, an image reception unit 710, a person area detection unit 213, a person feature amount extraction unit 214, a person feature amount recording unit 215, a similar person detection unit 718, a detection result display unit 720, and a processing person selection unit 120. Further, this device is also equipped with a person search function for realizing the method of the present invention.

The image reception unit 710 is a processing unit that inputs an image from an outside of the device, and receives input image data from the imaging device 201.

The person area detection unit 213, the person feature amount extraction unit 214, and the person feature amount recording unit 215 are similar to the configuration elements in FIG. 1, and thus description is omitted.

In a case where a person is included as a result of detection of an image by the person area detection unit 213, the image having been received by the image reception unit 710 from the imaging device 201, the similar person detection unit 718 compares a result of a feature amount of the person, which is extracted by the person feature amount extraction unit 214 and a feature amount recorded in the person feature amount recording unit 215, which has been recorded in advance as a detection object, and performs detection according to whether the degree of similarity is a fixed value or more.

The detection result display unit 720 displays a similar person detection result obtained from the similar person detection unit 718 on a monitor of the terminal device 703.

The processing person selection unit 120 determines whether individually sending a plurality of the detection results of the person area detection unit 213 to the next processing.

Note that some functions of the terminal device 703, for example, the person area detection unit 213 may be arranged inside the imaging device 201. Further, the function of the terminal device 703 may be divided into two, and the detection result display unit 720 may be moved to another terminal device. The hardware configuration of the terminal device 703 that is a similar image detection device is completely the same as the hardware configuration of the terminal device 103 illustrated in FIG. 3.

[Search Person Collation Processing of Image Processing System]

Figure 8:
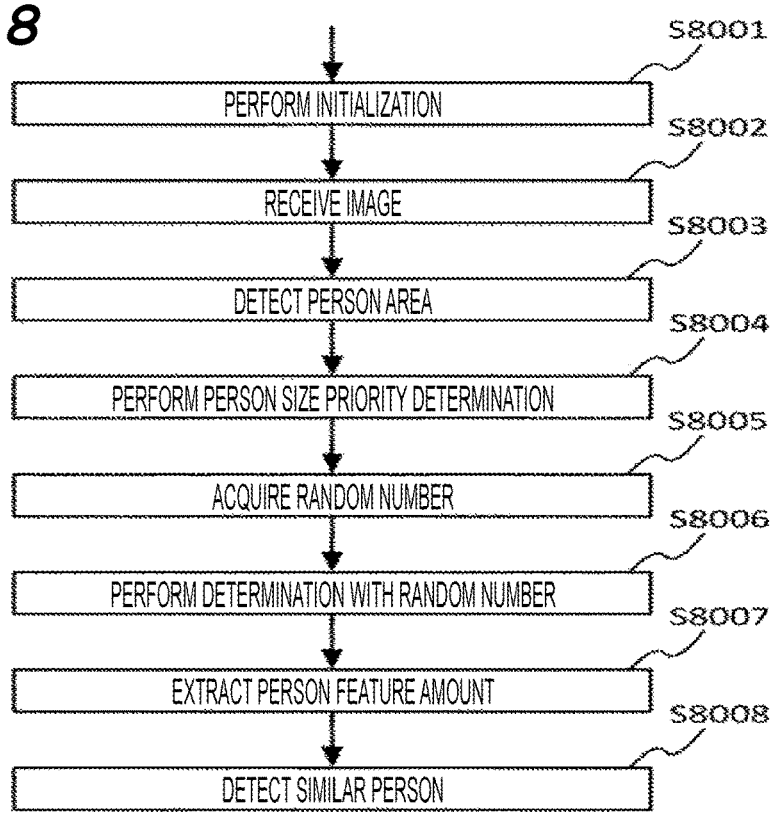
FIG. 8 is a diagram illustrating an example of a sequence of search person collation processing in the image processing system according to the second embodiment of the present invention.

Next, search person collation processing in the image processing system according to the second embodiment of the present invention will be described with reference to FIGS. 8 and 9. FIG. 8 is a diagram illustrating an example of a sequence of search person collation processing in the image processing system according to the second embodiment of the present invention. FIGS. 9(a) to 9(c) are diagrams illustrating examples of a search person registration table in the image processing system according to the second embodiment of the present invention. As illustrated in FIGS. 9(a) to 9(c), in each search person registration table 510, a person size and a current feature amount extraction flag in the search person collation processing in the image processing system are registered, respectively. In the present embodiment, a similar image detection system having performance corresponding to collate maximum three person images per image during the time interval will be described. The collation processing procedure per image in FIG. 8 is repeatedly executed for each image. Here, a case of detecting four person images per image will be described.

In initial initialization processing (S8001), a memory is secured and the current feature amount extraction flag is cleared to zero. Values in the search person registration table 510 on the memory are as illustrated in FIG. 9(a). For example, the person size is "72 pixels" for a person A, "60 pixels" for a person B, "48 pixels" for a person C, and "38 pixels" for a person D.

Next, in image receiving processing (S8002), the image reception unit 710 of the terminal device 703 receives an image from the imaging device 201.

Next, in process for detecting a person area (S8003), the person area detection unit 213 of the terminal device 703 detects a person area from the image. In this embodiment, the person area is an area of the face. Further, in the present embodiment, four person images are detected. The respective detected areas are held in the memory and are made referable by the next processing.

Next, identifying a person image based on a person size (S8004), random number acquisition processing (S8005), and determination processing with random number (S8006) are performed by the processing person selection unit 120 of the terminal device 703.

In the identifying a person image based on a person size (S8004), processing of selecting two person images having a large person size from among the persons A to D is performed. In the example illustrated in FIG. 9(b), the person A having the person size "72 pixels" and the person B having the person size "60 pixels" are selected. The current feature amount extraction flags of the selected person A and person B are changed to "1".

In this embodiment, in the identifying a person image based on a person size (S8004), the processing of selecting two person images is performed. However, the number of the person images may be one instead of two. In addition, if the performance to register the person images during the time interval is not three but four, three person images may be selected.

In the random number acquisition processing (S8005), a random number is acquired. The random number may not be a random number that is used in encryption as long as the random number has digits that can be detected. Here, assume that a two-digit random number is acquired and a value of "15" can be acquired, for example.

In the determination processing with random number (S8006), the random number acquired in the random number acquisition processing (S8005) is divided by the number of persons having the current feature amount extraction flag of "0". When the remainder is "0", the first person is selected from among the persons having the current feature amount extraction flag of "0". When the remainder is "1", the second person is selected.

In the present embodiment, the two persons C and D have the current feature amount extraction flag of "0", and 15÷2=7 and the remainder 1, and thus the second person D is selected. When the person D is selected, the current feature amount extraction flag of the person D becomes "1" as illustrated in FIG. 9(c).

In the process for extracting a feature amount of the person (S8007), the person feature amount extraction unit 214 of the terminal device 703 calculates the feature amount for the person area of the person having the current feature amount extraction flag of "1" by an image recognition technique. Specifically, in the case of FIG. 9 (c), the feature amount is calculated for the persons A, B, and D.

In the similar person detection processing (S8008), the similar person detection unit 718 performs processing of comparing a feature amount of a person recorded in the person feature amount recording unit 215 of the terminal device 703 and a feature amount of a person extracted by receiving an image from the imaging device 201 this time. When the degree of similarity is a fixed value or more, processing of causing the detection result display unit 720 to display a result is performed. In the embodiment, the processing is performed for the persons A, B and D.

The determination processing with random number described in the present embodiment is an example of a method of exhaustively processing a plurality of persons. In person image processing in a moving image, when ten frames are detected until persons pass through in front of the imaging device 201, it can be said that a possibility of not being processed becomes $1/1024$ (1 of the 10th power of 2) and is small and thus the processing can be exhaustively performed, if processing of selecting one of two persons with a random number is performed.

In the present embodiment, the identifying a person image based on a person size (S8004) is provided. However, the identifying a person image can be based at least in part on a direction that a person is facing. For example, a person image of a person substantially facing a camera can be identified as a person image for extracting a feature amount, instead of the detected person size of the image. In addition, in the process for detecting a person area (S8003), a person image substantially determined to be more likely to be a person, can be identified as a person image for extracting a feature amount. An image of a person here may be employed the whole image of a person, or only the face image of a person to determine to be more likely to be a person.

Further, in the present embodiment, the determination processing with random number (S8006) is provided. However, a person area tracking result may be used, similarly to the first embodiment of the present invention. Further, similarly, the determination processing with random number (S8006) may be provided in an image processing system as in the first embodiment of the present invention.

In the present embodiment, each similar image search system or similar image detection system performs both the preferential processing and the exhaustive processing as for a single frame, respectively. However, processing similar to the present embodiment may be performed over a plurality of frames. For example, the preferential processing may be performed for odd frames and the exhaustive processing may be performed for even frames.

As described above, according to the image processing system of the second embodiment of the present invention, omission of an image or a person to be processed is reduced and search and detection accuracy can be improved.

Note that the present invention is not limited to the embodiments per se and can be embodied by modification of the configuration elements in an implementation stage without departing from the gist of the invention. In addition, various inventions can be formed by an appropriate combination of a plurality of the configuration elements disclosed in the above embodiments. For example, some configuration elements may be deleted from all the configuration elements described in the embodiments.

INDUSTRIAL APPLICABILITY

The present invention is used in the industry that provides an image processing system suitable for use in thinning out detection results of similar image search or similar image detection of a specific person in a video captured/recorded by a video surveillance system.

REFERENCE SIGNS LIST

102 Recording device
103 Terminal device
110 Keyword recording unit
111 Keyword search unit
112 Keyword assignment request transmission unit
113 Multiple-search-keys selection unit
120 Processing person selection unit
200 Network
201 Imaging device
210 Image transmission/reception unit
211 Image recording unit
212 Playback control unit
213 Person area detection unit
214 Person feature amount extraction unit
215 Person feature amount recording unit
216 Attribute information recording unit
217 Request reception unit
218 Similar person search unit
219 Appearance event search unit
220 Search result transmission unit
221 Search request transmission unit
222 Search result reception unit
223 Search result display unit
224 Playback image display unit
225 Screen operation detection unit
240 Bus
241 Imaging unit
242 Main storage unit
243 Encoding unit
245 Network I/F
250 Bus
251 CPU
252 Main storage unit
253 Auxiliary storage unit
254 Network I/F
260 Bus
261 CPU
262 Main storage unit
263 Auxiliary storage unit
264 Display I/F
265 Input/output I/F
266 Network I/F
270 Display device
280 Keyboard
282 Mouse
500 Search person registration table
510 Search person registration table
703 Terminal device
710 Image reception unit
718 Similar person detection unit
720 Detection result display unit

The invention claimed is:

1. An image processing device for calculating a feature amount of a person image from an image, the image processing device comprising:
a person image detector configured to detect a person image from an image;
a person feature amount extractor configured to calculate a person feature amount of the person image using an image recognition technique;
a person size calculator configured to calculate an image size of the person image; and
an extraction target selector configured to:
select a first person image having a largest image size from among a plurality of person images, detected by the person image detector, in a search person registration table as the first person image for extracting the person feature amount, and
select a second person image having at least a minimum cumulative number of times for extracting the person feature amount from among the plurality of person images in the search person registration table, excluding the first person image, as the second person image for extracting the person feature amount,
wherein the selecting the second person image having at least the minimum cumulative number of times for extracting includes:
selecting a person having a least number of times features have been extracted from the person in the search person registration table, excluding the first person image, having a current feature amount extraction flag of "0",
increasing the number of times features have been extracted from the person by one, and
setting the current feature amount extraction flag of the person to "1".

2. An image processing device for calculating a feature amount of a person image from an image, the image processing device comprising:
a person image detector configured to detect a person image from an image;
a person feature amount extractor configured to calculate a feature amount of the person image using an image recognition technique;
a person size calculator configured to calculate an image size of the person image;
a random number generator configured to generate a random number; and
an extraction target selector configured to:
select a first person image having a largest image size from among a plurality of person images, detected by the person image detector, in a search person registration table as the first person image for extracting the person feature amount, and
select a second person image by performing an arithmetic determination operation using the random number generated by the random number generator, from among the plurality of person images in the search person registration table, excluding the first person image, as the second person image for extracting the person feature amount,
wherein the arithmetic determination operation using the random number comprises:
determining a remainder of dividing the random number by a number of persons in the search person registration table, excluding the first person image, having a current feature amount extraction flag of "0", when the remainder is "0", a person listed first in the search person registration table, excluding the first person image, is selected from among the persons having the current feature amount extraction flag of "0", and when the remainder is "1", a person listed second in the search person registration table, excluding the first person image, is selected.

3. A method of processing an image, the method comprising:

receiving an image;

detecting a plurality of person images in the image;

identifying at least a first person image from among the plurality of person images in a search person registration table by selection processing;

identifying at least a second person image from among the plurality of person images, excluding the first person image, in the search person registration table by exhaustive processing; and extracting a first feature amount as to the first person image and a second feature amount as to the second person image during a time interval, wherein the exhaustive processing includes a determination processing, the determination processing comprising:

using a random number acquired in a random number acquisition processing;

determining a remainder of dividing the random number by a number of persons in the search person registration table, excluding the first person image, having a current feature amount extraction flag of "0", in response to the remainder of the dividing is "0", a person listed first in the search person registration table, excluding the first person image, is selected from among persons having the current feature amount extraction flag of "0", and in response to the remainder of the dividing is "1", a person listed second in the search person registration table, excluding the first person image, is selected.

4. The method of claim 3, wherein a total number of a plurality of first person images and a plurality of second person images is no more than a maximum number of the plurality of person images based on processing capacity to processing the first and second plurality of person images during the time interval.

5. The method of claim 4, wherein the selection processing includes determining a person image having a largest person size, among the detected plurality of person images in the image.

6. The method of claim 4, wherein the selection processing includes determining a person image substantially facing a camera.

7. The method of claim 4, wherein the selection processing includes determining a person image substantially being more likely to be a person by the detecting a plurality of person images in the image.

8. The method of claim 4, wherein the exhaustive processing further includes determining a person image having a least number of times features have been extracted from the person in the search person registration table, excluding the first person image.

9. The method of claim 4, wherein the exhaustive processing further includes determining a person image based at least in part on the random number.

10. The method of claim 5, where the exhaustive processing further includes determining a person image having a least number of times features have been extracted from the person in the search person registration table, excluding the first person image.

11. The method of claim 10, further comprising:

recording at least the first feature amount and the second feature amount.

12. The method of claim 5, wherein the exhaustive processing further includes determining a person image based at least in part on the random number.

13. The method of claim 12, further comprising:

detecting a similar person by referring to at least the first feature amount or the second feature amount.

14. The method of claim 3, wherein the time interval includes a time interval consisting of a plurality of frames.

15. The method of claim 14, wherein a total number of the plurality of first person images and the plurality of second person images is no more than a maximum number of the plurality of person images based on processing capacity to processing the first and second plurality of person images during the time interval consisting of the plurality of frames.

16. The method of claim 15, wherein identifying the first person image by the selection processing is performed by referring to at least a frame, received during the time interval consisting of the plurality of frames, and identifying the second person image by the exhaustive processing is performed by referring to at least another frame, received during the time interval consisting of the plurality of frames.

17. The method of claim 16, wherein the selection processing includes determining a person image having at least a largest person size, among the detected plurality of person images in the image.

18. The method of claim 16, wherein the exhaustive processing further includes determining a person image having a least number of times features have been extracted from the person, excluding the first person image.

19. The method of claim 16, wherein the exhaustive method further includes determining a person image based at least in part on a random number.

20. The method of claim 15, wherein identifying the first person image by the selection processing is performed at either an odd frame or an even frame, and identifying the second person image by the exhaustive processing is performed at a frame having another parity.

* * * * *